United States Patent
Narukawa et al.

(10) Patent No.: US 6,534,216 B1
(45) Date of Patent: Mar. 18, 2003

(54) POSITIVE ELECTRODE FOR NON-AQUEOUS ELECTROLYTE CELL AND MANUFACTURING METHOD OF THE SAME

(75) Inventors: Satoshi Narukawa, Sumoto (JP); Naoki Imachi, Sumoto (JP); Shiori Nakamizo, Amagasaki (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/490,535

(22) Filed: Jan. 25, 2000

(30) Foreign Application Priority Data

Jan. 25, 1999 (JP) .......................... 11-016141

(51) Int. Cl.$^7$ .............................. H01M 4/50; H01M 4/52
(52) U.S. Cl. ................ 429/224; 429/223; 429/231.1; 429/231.3; 429/231.5; 29/623.1
(58) Field of Search .................. 429/224, 223, 429/231.3, 231.1, 231.5; 29/623.1

(56) References Cited

U.S. PATENT DOCUMENTS

| | | | |
|---|---|---|---|
| 4,904,552 A | | 2/1990 | Furukawa et al. |
| 5,429,890 A | * | 7/1995 | Pynenburg et al. |
| 5,742,070 A | * | 4/1998 | Hayashi et al. ......... 252/182.1 |
| 5,759,719 A | * | 6/1998 | Mao ................. 429/223 |
| 5,783,333 A | * | 7/1998 | Mayer ............... 429/223 |
| 5,871,863 A | * | 2/1999 | Miyasaka ............ 429/218 |
| 6,007,947 A | * | 12/1999 | Mayer ............... 429/231.1 |
| 6,159,636 A | * | 12/2000 | Wang et al. .......... 429/223 |
| 6,228,529 B1 | * | 5/2001 | Kitoh ................ 429/164 |

FOREIGN PATENT DOCUMENTS

| | | |
|---|---|---|
| JP | 09 293538 | 11/1997 |
| JP | 10 92430 | 4/1998 |
| JP | 10 092430 | 4/1998 |
| JP | 10-112318 | 4/1998 |
| WO | 97 01191 A | 1/1997 |
| WO | 97 24773 | 7/1997 |
| WO | 98 24131 A | 6/1998 |

* cited by examiner

Primary Examiner—Carol Chaney
Assistant Examiner—Tracy Dove
(74) Attorney, Agent, or Firm—Nixon & Vanderhye PC

(57) ABSTRACT

A positive electrode for a non-aqueous electrolyte cell containing spinel-type lithium manganese oxide as a main active material, wherein the positive electrode is comprised of a mixture of spinel-type lithium manganese oxide represented by a formula $Li_{1+X}Mn_{2-Y}O_4$ (provided that the atomic ratio of lithium and manganese is determined to be $0.56 \leq Li/Mn [=(1+X)/(2-Y)] \leq 0.62$, X is determined to be $-0.2 \leq X \leq 0.2$, and Y is determined to be $Y \leq 1.0$) and at least either one of lithium cobalt oxide represented by a formula $Li_{1+Z}CoO_2$ (provided that Z is determined to be $-0.5 \leq Z \leq 0.5$) or lithium nickel oxide represented by a formula $Li_{1+Z}NiO_2$ (provided that Z is determined to be $-0.5 \leq Z \leq 0.5$), and wherein in the case that the weight of spinel-type manganese oxide is defined as A and that the weight of the lithium cobalt oxide or lithium nickel oxide is defined as B, the amount of lithium cobalt oxide or lithium nickel oxide is determined to be $0.5 \leq B/(A+B) < 0.2$.

14 Claims, 11 Drawing Sheets

POSITIVE ELECTRODE FOR NON-AQUEOUS ELECTROLYTE CELL AND MANUFACTURING METHOD OF THE SAME

RELATED APPLICATION

This application claims priority from Japanese Patent Application No. 11-016141 filed Jan. 25, 1999, the contents of which are incorporated hereinto by this reference.

BACKGROUND OF THE INVENTION

1. Field of the Invention

The present invention relates to a positive electrode for a non-aqueous electrolyte cell containing spinel-type lithium manganese oxide as a primary active material and a manufacturing method of the same. The present invention is also concerned with a non-aqueous electrolyte cell including a negative electrode comprised of a negative active material capable of intercalating and deintercalating a lithium ion, a positive electrode containing spinel-type lithium manganese oxide and a non-aqueous electrolytic material and a manufacturing method of the non-aqueous electrolyte cell.

2. Description of the Prior Art

In recent years, a non-aqueous electrolyte cell such as a lithium-ion cell has been commercially used as a rechargeable cell of small size, light weight, higher capacity for portable electronic devices and communication equipments such as a small size video camera, a portable telephone, a note-type personal computer, etc. The non-aqueous electrolyte cell includes a negative electrode active material in the form of an alloy or a carbon material capable of intercalating and deintercalating a lithium-ion and a positive electrode material in the form of a transition metal oxide containing lithium such as lithium cobalt oxide ($LiCoO_2$), lithium nickel oxide ($LiNiO_2$), lithium manganese oxide or the like.

In the transition metal oxide containing lithium for the non-aqueous electrolyte cell, lithium nickel oxide ($LiNiO_2$) is useful to provide a higher capacity cell but inferior in stability and function compared to lithium cobalt oxide ($LiCoO_2$). Lithium manganese oxide ($LiMn_2O_4$) is rich in resources and obtainable at a low cost but inferior compared to lithium cobalt oxide ($LiCoO_2$) since it is lower in energy density and the manganese itself is dissolved at a high temperature. For these reasons, lithium cobalt oxide is mainly used as the transition metal oxide containing lithium.

However, when a non-aqueous electrolyte cell of this kind is useful in large size equipments such as hybrid automotive vehicles, it is sometimes decided to use lithium manganese oxide ($LiMn_2O_4$) which is rich in resources and lower in price instead of lithium cobalt oxide ($LiCoO_2$). Under such technical background, as in Japanese Patent Laid-open Publication No. 9-293538, there has been proposed a method for enhancing the energy density of lithium manganese oxide by addition of lithium cobalt oxide ($LiCoO_2$) or lithium nickel oxide ($LiNiO_2$).

The method disclosed in Japanese Patent Laid-open Publication No. 9-293538 is, however, insufficient for enhancement of the energy density of lithium manganese oxide. To enhance the property of lithium manganese oxide used as an active material for a positive electrode, it is very important to enhance its high temperature cycle performance and storage characteristics. As to its high temperature performance, there have been proposed various methods for stabilizing the crystal structure of the active material by addition of different kinds of elements. However, an effective substitution element such as chromium is injurious to humans, and the energy density of the active material is decreased if the amount of additive elements is excessive. For these reasons, there has not yet been proposed any practical method for improvement of its high temperature cycle performance.

As to storage characteristics of the active material, self-discharge of lithium manganese oxide ($LiMn_2O_4$) caused by reaction with electrolyte results in generation of gaseous products. This deteriorates cell characteristics. Such phenomena will noticeably occur if the lithium manganese oxide is stored in a discharging condition. Additionally, when the lithium manganese oxide is preserved at a high temperature, a large amount of gaseous products will generate due to dissolution of manganese itself.

SUMMARY OF THE INVENTION

A primary object of the present invention is to provide a positive electrode of higher energy density for a non-aqueous electrolyte cell in which self-discharge of lithium manganese oxide used as a main active material is restrained to enhance storage characteristics of the cell at higher temperature and to provide a non-aqueous electrolyte cell superior in the characteristics described above.

According to the present invention, the object is accomplished by providing a positive electrode for a non-aqueous electrolyte cell comprised of a mixture of spinel-type lithium manganese oxide represented by a general formula $Li_{1+X}Mn_{2-Y}O_4$ (provided that an atomic ratio of lithium and manganese is defined to be $0.56 \leq Li/Mn\ [=1+X)/(2-Y)] \leq 0.62$ where X and Y are defined to be $-0.2 \leq X \leq 0.2$ and $Y \leq 1.0$, respectively) and lithium cobalt oxide represented by a general formula $Li_{1+Z}CoO_2$ ($-0.5 \leq Z \leq 0.5$) or lithium nickel oxide represented by a general formula $Li_{1+Z}NiO_2$ ($-0.5 \leq Z \leq 0.5$).

Lithium manganese oxide represented by the formula acts as a strong oxidization agent and generates a large amount of gaseous products due to reaction with electrolytes and electrolyte salts. This deteriorates the performance of the cell and deforms the cell due to abnormality in internal pressure, resulting in leakage of the electrolyte. However, in the case that the positive electrode is comprised of the mixture of lithium manganese oxide and lithium cobalt oxide or lithium nickel oxide, it has been found that that the generation amount of gaseous products is noticeably decreased since lithium cobalt oxide or lithium nickel oxide acts as a buffer agent to restrain oxidation of the electrolyte caused by lithium manganese oxide.

When a positive electrode of lithium manganese oxide is stored in a discharging condition, the electrolyte is decomposed by self-discharge of the electrode and generates a large amount of gaseous products. In such an instance, reaction of the discharged lithium manganese oxide with the electrolyte decreases the cell voltage and increases the negative electrode voltage. This causes the generation of a large amount of decomposed gaseous products of the electrolyte. However, in the case that lithium cobalt oxide or lithium nickel oxide is nixed with lithium manganese oxide to provide the positive electrode, it has been found that the generation of decomposed gaseous products is restrained even when the positive electrode is stored in a discharging condition.

In this case, it is assumed that when lithium manganese oxide becomes unstable at a final stage of discharge, lithium cobalt oxide or lithium nickel oxide becomes effective to prevent deterioration of lithium manganese oxide for enhancing the storage characteristics of the cell. It is also assumed that lithium cobalt oxide or lithium nickel oxide acts as a buffer agent to restrain dissolution of manganese for restraining the generation of gaseous products.

On the other hand, a retention rate of discharge capacity at the high temperature discharge cycle was measured by an experiment in relation to the atomic ratio of lithium and manganese in the spinal-type lithium manganese oxide. As a result, it has been found that the retention rate of discharge capacity is optimized when the atomic ratio of lithium and manganese is determined equal to or more than 0.56. In addition, the capacity per a unit active material (specific capacity) was measured by experiments in relation to the atomic ratio of lithium and manganese. As a result, it has been found that the specific capacity is maximized when the atomic ratio of lithium and manganese is defined to be equal to or less than 0.62. From these facts, it is desirable that the atomic ratio Li/Mn of lithium and manganese in spinel-type lithium manganese oxide is defined to be $0.56 \leq Li/Mn \leq 0.62$.

The effect of lithium cobalt oxide or lithium nickel oxide as the buffer agent increases in accordance with an increase of the mixed amount thereof. It is, therefore, desirable that the addition amount of lithium cobalt oxide and/or lithium nickel oxide is determined to be equal to or more than 5% by weight. In general, the discharge voltage of lithium cobalt oxide or lithium nickel oxide is low. It is, therefore, assumed that the addition of lithium cobalt oxide or lithium nickel oxide is effective to decrease the discharge voltage of the cell lower than that of lithium manganese oxide. However, as lithium cobalt oxide or lithium nickel oxide is superior in electronic conductivity, the discharge voltage of the cell was increased by addition of lithium cobalt oxide or lithium nickel oxide.

In the experiments, it has been found that if the addition amount of lithium cobalt oxide or lithium nickel oxide is more than 20% by weight, the discharge voltage of the cell is greatly influenced by lithium cobalt oxide or lithiun nickel oxide. It is, therefore, desirable that the addition amount of lithium cobalt oxide or lithium nickel oxide is less than 20% by weight. In the case that the weight of spinel-type lithium manganese oxide is defined as A and that the weight of lithium cobalt oxide or lithium nickel oxide is defined as B, it is desirable that the amount of lithium cobalt oxide or lithium nickel oxide mixed with lithium manganese oxide is determined to be $0.05 \leq B/(A+B) < 0.2$.

To improve the charge-discharge cycle performance of lithium manganese oxide, lithium cobalt oxide and lithium nickel oxide at a high temperature, various researches have been carried out to stabilize a crystal structure of the elements by addition of different kinds of metals. However, any practical different kind of metal has not yet been found. As a result of investigation of different kinds of metals to be added to a positive electrode containing a mixture of lithium manganese oxide with lithium cobalt oxide or lithium nickel oxide, it is has been found that a practical metal can be selected from the group consisting of magnesium, aluminum, calcium, vanadium, titanium, chromium, manganese, iron, cobalt, nickel, copper, zinc, strontium, zirconium, niobium, molybdenum and tin.

In the case that the different kind of metal is added to spinel-type lithium manganese oxide, it is desirable that the atomic ratio of lithium relative to a sum of manganese and the different metal is determined to be $0.56 \leq Li < (Mn + \text{Different metal}) \leq 0.62$ to increase the retention rate of discharge capacity at the charge-discharge cycle at a high temperature and to increase the specific capacity per unit active material.

In the case that lithium cobalt oxide or lithium nickel oxide is added to and mixed with lithium manganese oxide to produce the positive electrode, a degree of direct contact of particles is decreased if the lithium materials are simply mixed. In such an instance, the additive effect of the lithium cobalt oxide or lithium nickel oxide becomes insufficient. To increase the degree of direct contact of particles, it is desirable that the lithium materials are mixed under compression and crushing action or under compression, impact and shearing actions. In the case that the lithium materials are mixed under compression and crushing action, secondary particles of the materials are damaged, resulting in deterioration of the performance of the positive electrode. In contrast with the above case, in the case that the lithium materials are mixed under compression, impact and shearing actions, secondary particles of the materials are maintained without any damage to enhance the additive effect of lithium cobalt oxide or lithium nickel oxide.

The positive electrode manufactured by addition of lithium cobalt oxide or lithium nickel oxide to lithium manganese oxide can be adapted not only to a non-aqueous electrolyte cell using organic electrolyte but also to a non-aqueous electrolyte cell using solid polymer electrolyte. As the solid polymer electrolyte is relatively higher in viscosity, a problem in impregnation of the electrolyte will occur in use of only lithium manganese oxide. In this respect, the positive electrode manufactured by addition of lithium cobalt oxide or lithium nickel oxide to lithium manganese oxide can be formed thinner to solve the problem in impregnation of the electrolyte. In this case, it is preferable that the solid polymer electrolyte is used in the form of mixed gel of lithium salt, electrolyte, and polymer selected from the group consisting of solid polymer of polycarbonate, solid polymer of polyacrylonitrile, copolymer or bridged polymer comprised of more than two kinds of the solid polymers and flouride solid polymer such as polyvinylidene difluoride (PVDF).

DESCRIPTION OF PREFERRED EMBODIMENTS

Figure 1:
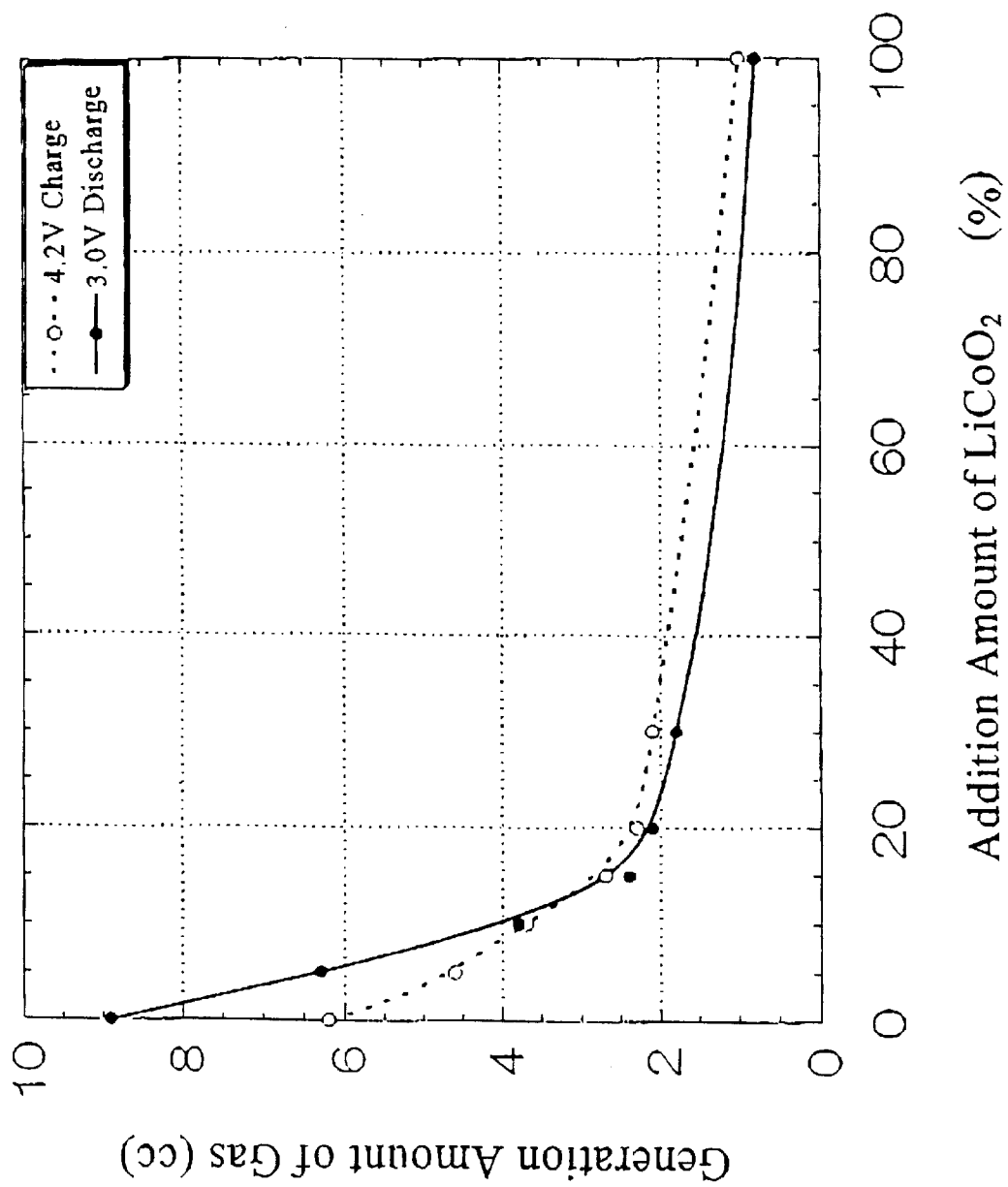
FIG. 1 is a graph showing a generation amount of gaseous products in relation to an addition amount of lithium cobalt oxide at 60° C.

Hereinafter, a preferred embodiment of the present invention will be described in detail.

1. Production of Positive Electrodes

EXAMPLE 1

Composite powder of 200 g comprised of 95 wt % spinel-type lithium manganese oxide represented by a general formula $Li_{1+X}Mn_{2-Y}O_4$ ($-0.2 \leq X \leq 0.2$); $Y \leq 1.0$) and 5 wt % lithium cobalt oxide represented by a general formula $Li_{1+Z}CoO_2$ ($-0.5 \leq Z \leq 0.5$) was prepared, and an appropriate amount of carbon conductive agent and graphite was added to and mixed with the composite powder. The mixed powder was introduced into a mixing device (For example, a mechano-fasion device (AM-15F) made by Hosokawa Micron Co. Ltd.).

The mixing device was operated at a rotation speed of 1500 rpm for ten minutes to mix the composite powder under compression, impact and shearing actions thereby to prepare a mixed active material for a positive electrode. In such an instance, lithium cobalt oxide was brought into electric contact with lithium manganese oxide. Subsequently, an amount of fluorocarbon resin binder was mixed with the mixed active material at a predetermined ratio to produce a mixed agent for the positive electrode. Thus, the mixed agent was coated on opposite surfaces of a positive electrode collector in the form of aluminum foil and rolled under pressure after dried to produce a positive electrode a) of predetermined thickness as Example 1.

EXAMPLE 2

Composite powder of 200 g comprised of 90 wt % spinel-type lithium manganese oxide represented by a general formula $Li_{1+X}Mn_{2-Y}O_4$ ($-0.2 \leq X \leq 0.2$: $Y \leq 1.0$) and 10 wt % lithium cobalt oxide represented by a general formula $Li_{1+Z}CoO_2$ ($-0.5 \leq Z \leq 0.5$) was prepared and introduced into the mixing device. The mixing device was operated at the rotation speed of 1500 rpm for ten minutes to mix the composite powder under compression, impact and shearing actions to prepare a mixed active material for a positive electrode. In such an instance, lithium cobalt oxide was brought into electric contact with lithium manganese oxide. Subsequently, an appropriate amount of carbon conductive agent and graphite was added to and mixed with the mixed active material. Thereafter, an amount of binder in the form of fluorocarbon resin was mixed at a predetermined ratio to prepare a mixed agent for the positive electrode. Thus, the mixed agent was coated on opposite surfaces of a positive electrode collector in the form of aluminum foil and rolled under pressure after dried to produce a positive electrode b) of predetermined thickness as Example 2.

EXAMPLE 3

Composite powder of 200 g comprised of 85 wt % spinel-type lithium manganese oxide represented by the formula $Li_{1+X}Mn_{2-Y}O_4$ ($-0.2 \leq X \leq 0.2$: $Y \leq 1.0$) and 15 wt % lithium cobalt oxide represented by the formula $Li_{1+Z}CoO_2$ ($-0.5 \leq Z \leq 0.5$) was prepared and introduced into the mixing device. The mixing device was operated at the rotation speed of 1500 rpm for ten minutes to mix the composite powder under compression, impact and shearing actions to prepare a mixed active material for a positive electrode. In such an instance, lithium cobalt oxide was brought into electric contact with lithium manganese oxide. Subsequently, an appropriate amount of carbon conductive agent and graphite was added to and mixed with the mixed active material. Thereafter, an amount of fluorocarbon resin binder was mixed at a predetermined ratio to prepare a mixed agent for the positive electrode. Thus, the mixed agent was coated on opposite surfaces of a positive electrode collector in the form of aluminum foil and rolled under pressure after dried to produce a positive electrode c) of predetermined thickness as Example 3.

EXAMPLE 4

Composite powder of 200 g comprised of 80.5 wt % spinel-type lithium manganese oxide represented by the formula $Li_{1+X}Mn_{2-Y}O_4$ ($-0.2 \leq X \leq 0.2$: $Y \leq 1.0$) and 19.5 wt % lithium cobalt oxide represented by the formula $Li_{1+Z}CoO_2$ ($-0.5 \leq Z \leq 0.5$) was prepared and introduced into the mixing device. The mixing device was operated at the rotation speed of 1500 rpm for ten minutes to mix the composite powder under compression, impact and shearing actions to prepare a mixed active material for a positive electrode. In such an instance, lithium cobalt oxide was brought into electric contact with lithium manganese oxide. Subsequently, an appropriate amount of carbon conductive agent and graphite was added to and mixed with the mixed active material. Thereafter, an amount of fluorocarbon resin binder was mixed at a predetermined ratio to prepare a mixed agent for the positive electrode. Thus, the mixed agent was coated on opposite surfaces of a positive electrode collector in the form of aluminum foil and rolled under pressure after dried to produce a positive electrode d) of predetermined thickness as Example 4.

COMPARATIVE EXAMPLE 1

An appropriate amount of carbon conductive agent and graphite was added to and mixed with spinel-type lithium manganese oxide represented by the formula $Li_{1+X}Mn_{2-Y}O_4$ ($-0.2 \leq X \leq 0.2$: $Y \leq 1.0$) and also mixed with an amount of fluorocarbon resin binder at a predetermined ratio to prepare a mixed agent for a positive electrode. Thus, the mixed agent was coated on opposite surfaces of a positive electrode collector and rolled under pressure after dried to produce a positive electrode e) as Comparative example 1.

COMPARATIVE EXAMPLE 2

Composite powder of 200 g comprised of 70 wt % spinel-type lithium manganese oxide represented by the formula $Li_{1+X}Mn_{2-Y}O_4$ ($-0.2 \leq X \leq 0.2$: $Y \leq 1.0$) and 30 wt % lithium cobalt oxide represented by the formula $Li_{1+Z}CoO_2$ ($-0.5 \leq Z \leq 0.5$) was prepared and introduced into the mixing device. The mixing device was operated at the rotation speed of 1500 rpm for ten minutes to mix the composite powder under compression, impact and shearing actions to prepare a mixed active material for a positive electrode. In such an instance, lithium cobalt oxide was brought into electric contact with lithium manganese oxide. Subsequently, an appropriate amount of carbon conductive agent and graphite was added to and mixed with the mixed active material.

Thereafter, an amount of fluorocarbon resin binder was mixed at a predetermined ratio to prepare a mixed agent for the positive electrode. Thus, the mixed agent was coated on opposite surfaces of a positive electrode collector in the form of aluminum foil and rolled under pressure after dried to produce a positive electrode f) of predetermined thickness as Comparative example 2.

COMPARATIVE EXAMPLE 3

An appropriate amount of carbon conductive agent and graphite was added to and mixed with lithium cobalt oxide represented by a general formula $Li_{1+Z}CoO_2$ ($-0.5 \leq Z \leq 0.5$) and further mixed with an amount of fluorocarbon resin binder at a predetermined ratio to prepare a mixed agent for a positive electrode. Thus, the mixed agent was coated on opposite surface of a positive electrode collector in the form of aluminum foil and rolled under pressure after dried to produce a positive electrode g) of predetermined thickness as Comparative example 3.

To measure each initial charge capacity of the positive electrodes a) to g), each thickness of the positive electrodes a), b), c), d) of Examples 1 to 4 and the positive electrodes e), f), g) of Comparative examples 1 to 3 was measured, and the positive electrodes were placed in a three-pole type glass cell and charged and discharged at 4.3 V to 3.1 V in a condition where counter and reference electrodes were Li foil. A result of the test is shown in the following table 1.

TABLE 1

| Positive electrodes | Thickness ($\mu$m) | Initial charge capacity (mAH/g) |
|---|---|---|
| a | 180 | 112.8 |
| b | 176 | 115.5 |
| c | 172 | 118.3 |
| d | 169 | 121.0 |
| e | 184 | 110.0 |
| f | 163 | 126.5 |
| g | 130 | 165.0 |

As is understood from the table 1, the energy density of the respective positive electrodes a) to d) was increased by addition of lithium cobalt oxide to lithium manganese oxide, and the raw material cost of the positive electrodes was noticeably reduced. Since the thickness of the positive electrode is thinned, the load characteristic of the cell is enhanced. If the positive electrodes using only lithium manganese oxide was rolled under pressure as in the thickness of lithium cobalt oxide, the electrolyte would not be completely impregnated, and the strength of the positive electrode against bending would be decreased. Such problems can be solved.

To provide a positive electrode with the same effect, a portion of lithium manganese oxide or lithium cobalt oxide may be substituted for a different kind of metal selected from the group consisting of magnesium (Mg), aluminum (Al), calcium (Ca), vanadium (V), titanium (Ti), chromium (Cr), manganese (Mn), iron (Fe), cobalt (Co), nickel (Ni), copper (Cu), zinc (Zn), strontium (Sr), zirconium (Zr), niobium (Nb), molybdenum (Mo) and tin (Sn).

2. Production of Negative Electrode

A negative electrode active material capable of intercalating and deintercalating lithium-ion, fluorocarbon resin binder and water were mixed to prepare a mixed agent for a negative electrode, and a negative electrode collector in the form of a copper foil was coated with the mixed agent at its opposite surfaces to produce a negative electrode. In this instance, it is desirable that a carbon material capable of intercalating and deintercalating lithium-ion such as graphite, carbon black, coke, glassy carbon, carbon fiber, or a sintered body of the materials is used as the active material of the negative electrode. In addition, an oxide capable of intercalating and deintercalating lithium-ion such as tin oxide, titanium oxide or the like may be used as the active material for the negative electrode.

3. Production of Experimental Lithium-ion Cell

The positive electrodes a), b), c), d) of Examples 1 to 4 and the positive electrodes e), f), g) of Comparative examples 1 to 3 each were connected to a lead wire, and the negative electrodes manufactured as described above each are connected to a lead wire. The positive and negative electrodes each were spirally wound with a separator of polypropylene disposed therebetween to provide a cylindrical generator element. The generator element was contained in a bottomed cell casing, and the lead wire was connected to a positive electrode terminal or a negative electrode terminal. The cell casing was filled with electrolyte comprised of mixed equivolume solvent of ethylene carbonate (EC) and diethyl carbonate (DEC) added with lithium hexafluorophosphate ($LiPF_6$) of 1 mol per liter and closed at its opening end to provide experimental cells A–G of 500 mAH in nominal capacity. The experimental cells may be formed in a thin type, an angular type, a cylindrical type or other appropriate type.

Hereinafter, the experimental cells provided with the positive electrodes a) to d) are referred to cells A to D, respectively, and the experimental cells provided with the positive electrodes e) to g) are referred to cells F to G, respectively. In the experimental cells, the mixed solvent of ethylene carbonate (EC) and diethyl carbonate (DEC) may be substituted for aprotic solvent in the form of a mixture of dimethyl carbonate (DMC) and ethyl-methyl carbonate (EMC). The mixing ratio of EC to DEC or DMC to EMC is determined in an extent of 5:95–60:40. Except for $LiPF_6$, $LiBF_4$, $LiClO_4$, imidic salt such as $LiN(SO_2C_2F_5)_2$ and the like may be used.

4. Experiment (1) High Temperature Storage Test

The experimental cells A to G each were charged by a charging current of 500 mA (1C) in an atmosphere of room temperature respectively until the voltage becomes 4.2 V Subsequently, the cells were further charged at the constant voltage of 4.2 V until the charging current becomes less than 25 mA. After rested for ten minutes, the cells were discharged at 500 mA (1C) respectively until the voltage becomes 3.0 V After charged and discharged as described above, the cells were charged by a charging current of 500 mA (1C) in an atmosphere of room temperature until the voltage becomes 4.2 V Thereafter, the cells were charged at the constant voltage of 4.2 V until the charging current becomes less than 25 mA and stored in an atmosphere of 60° C. for twenty days.

After measured the voltage of each of the stored cells A–G and a generation amount of gaseous products, the discharge capacity of each of the stored cells was measured on a basis of a discharging time during which the voltage at 500 mA (1C) becomes 3.0 V, and a ratio of the discharge capacity to the initial capacity was measured to calculate each retention rate of capacity of the cells. In addition, the cells were charged and discharged to measure each recovery rate of capacity thereof based on the discharging time, and a ratio of the recovery capacity to the initial capacity was measured to calculate each recovery ratio of the cells. The results are shown in the following table 2, and the generation amount of gaseous products in relation to the addition amount of lithium cobalt oxide is shown in FIG. 1.

TABLE 2

| Cell | Voltage drop | Generation amount of gaseous products | Retention rate of capacity | Recovery rate of capacity |
|---|---|---|---|---|
| A | 0.16 | 4.6 | 57 | 73 |
| B | 0.15 | 3.7 | 59 | 76 |
| C | 0.15 | 2.7 | 61 | 78 |
| D | 0.13 | 2.3 | 63 | 79 |
| E | 0.17 | 6.2 | 56 | 72 |
| F | 0.13 | 2.1 | 64 | 80 |
| G | 0.11 | 1.0 | 67 | 84 |

As is understood from the table 2, the generation amount of gaseous products in the cell E of Comparative example 1 was increased more than that in the other cells for the following reason. Lithium manganese oxide acts as a strong oxidation agent and causes the generation of a large amount of gaseous products by reaction with the electrolyte and electrolyte salt. This results in deformation of the cell casing and leakage of the electrolyte from the cell casing and deteriorates the safety of the cell.

As is understood from the graph of FIG. 1 and the table 2, the generation amount of gaseous products and voltage drop (self-discharge) decreased in accordance with an increase of the addition amount of lithium cobalt oxide as in the order of cells A→B→C→D→E→F→G listed in the table 2. This results in an increase of the retention rate of capacity and the recovery rate of capacity. Such a useful result is effected since lithium cobalt oxide is effective to restrain reaction of lithium manganese oxide with electrolyte and acts as a buffer agent to decrease the generation amount of gaseous products.

(2) Preservation Test After Discharge

The experimental cells A to G each were charged by a charging current of 500 mA (1C) in an atmosphere of room temperature until the voltage becomes 4.2 V Subsequently, the cells were further charged at the constant voltage of 4.2 V until the charging current becomes less than 25 mA. After rested for ten minutes, the cells were discharged at 500 mA (1C) until the discharge voltage becomes 3.0 V After charged and discharged as described above, the cells were stored in an atmosphere of 60 ?C for twenty days. After such storage, the voltage of the respective cells A to G and a generation amount of gaseous products were measured. The results are shown in the following table 3, and the generation amount of gaseous products in relation to the addition amount of lithium cobalt oxide is shown in FIG. 1.

TABLE 3

| Cell | Voltage drop (V) | Generation amount of gas (ml) |
|---|---|---|
| A | 1.62 | 6.3 |
| B | 0.98 | 3.8 |
| C | 0.63 | 2.4 |
| D | 0.43 | 2.1 |
| E | 3.44 | 8.9 |
| F | 0.37 | 1.8 |
| G | 0.17 | 0.8 |

As is understood from the table 3, the cell E of Comparative example 1 noticeably discharged itself after the discharged storage until the cell voltage becomes 0 V and generated a large amount of gaseous products with decomposition of the electrolyte for the following reason. Lithium manganese oxide in a discharged condition lowers the potential of the positive electrode by reaction with the electrolyte and raises the potential of the negative electrode. This results in an increase of the generation amount of gaseous products.

As is understood from the table 3 and FIG. 1, the generation amount of gaseous products and voltage drop were decreased in accordance with an increase of the addition amount of lithium cobalt oxide as in the order of cells A→B→C→D→E→F→G listed in the table 3. In this case, it is assumed that such a useful result is effected by the facts that lithium cobalt oxide becomes effective to prevent deterioration of ithium manganese oxide at the final stage of discharge and that lithium cobalt oxide acts as a buffer agent to decrease the generation amount of gaseous products.

(3) High Temperature Cycle Test

The experimental cells A–G each were charged by a charging current of 500 mA (1C) in an atmosphere of 60° C. until the cell voltage becomes 4.2 V. Subsequently, the cells were further changed at the constant voltage of 4.2 V under the charging current becomes less than 25 mA. After rested for ten minutes, the cells were discharged at 500 mA (1C) until the final voltage becomes 3.0 V The result of the chanrge-discharge cycle test is shown in FIG. 2.

Figure 2:
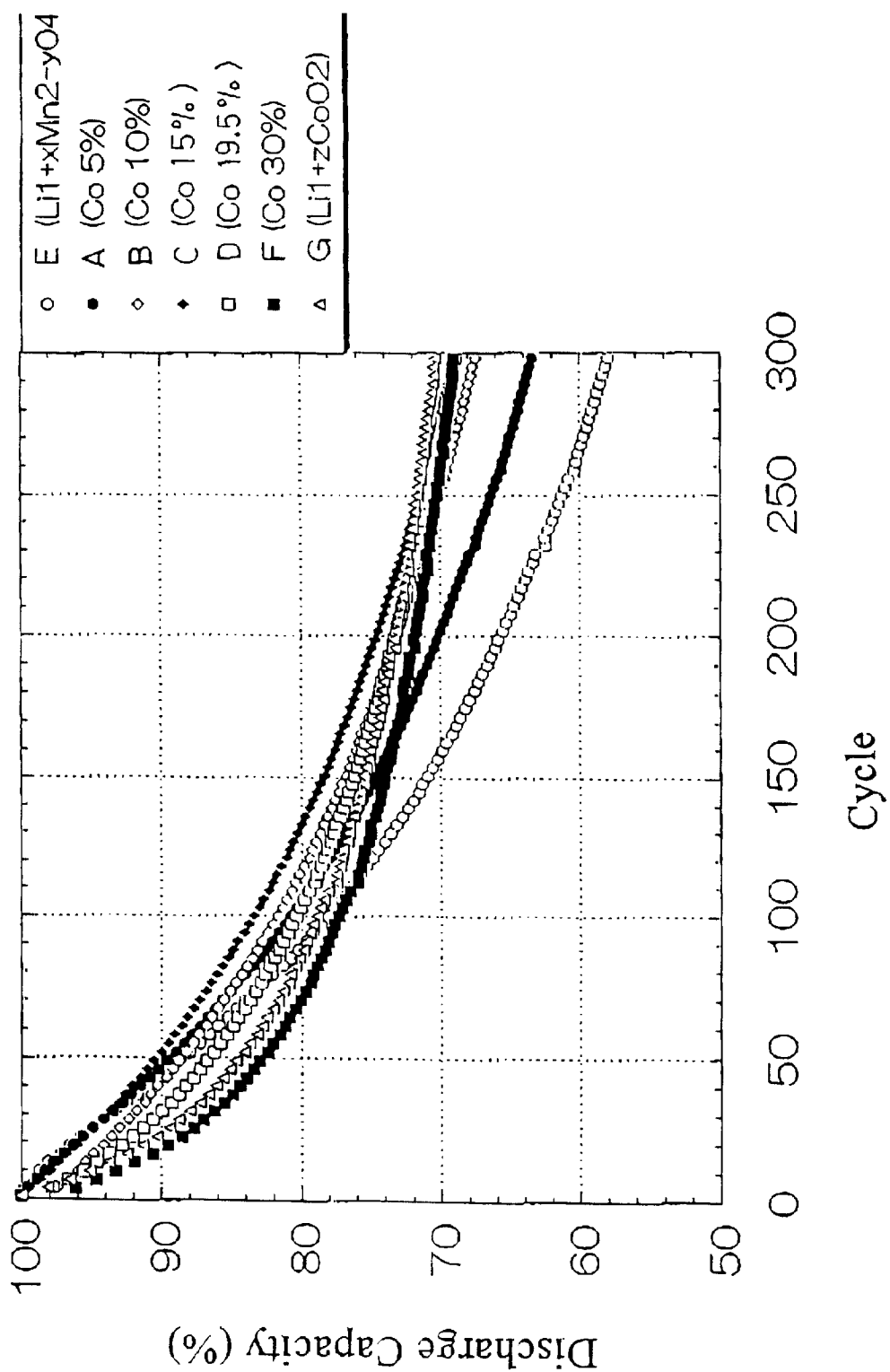
FIG. 2 is a graph showing a cycle performance at 60° C.

In a graph shown in FIG. 2, the cell A of Example 1 is marked with ●, the cell B of Example 2 is marked with ◇, the cell C of Example 3 is marked with ◆, the cell D of Example 4 is marked with □, the cell E of Comparative example 1 is marked with ○, the cell F of Comparative example 2 is marked with ■ , and the cell G of Comparative example 3 is marked with Δ.

As is understood from the graph of FIG. 2, deterioration of the cycle performance was reduced in accordance with an increase of the addition amount of lithium cobalt oxide. It is assumed that such a useful result is effected since lithium cobalt oxide acts as a buffer agent to restrain reaction of lithium manganese oxide with the electrolyte and electrolyte salt. As the restraint effect is increased in accordance with an increase of the addition amount of lithium cobalt oxide, it is needed that the amount of lithium cobalt oxide is determined to be at least more than 5% by weight.

(4) Charge-Discharge Test

The experimental cells A–G each were charged by a charging current of 500 mA (1C) in an atmosphere of room temperature under the cell voltage become 4.2 V Subsequently, the cells were further charged at the constant voltage of 4.2 V until the charging current becomes less than 25 mA. After rested for ten minutes, the cells were discharged by a discharging current of 500 mA (1C) until the voltage becomes 3.0 V. A result of the charge-discharge test is shown by a discharge curve in FIG. 3.

Figure 3:
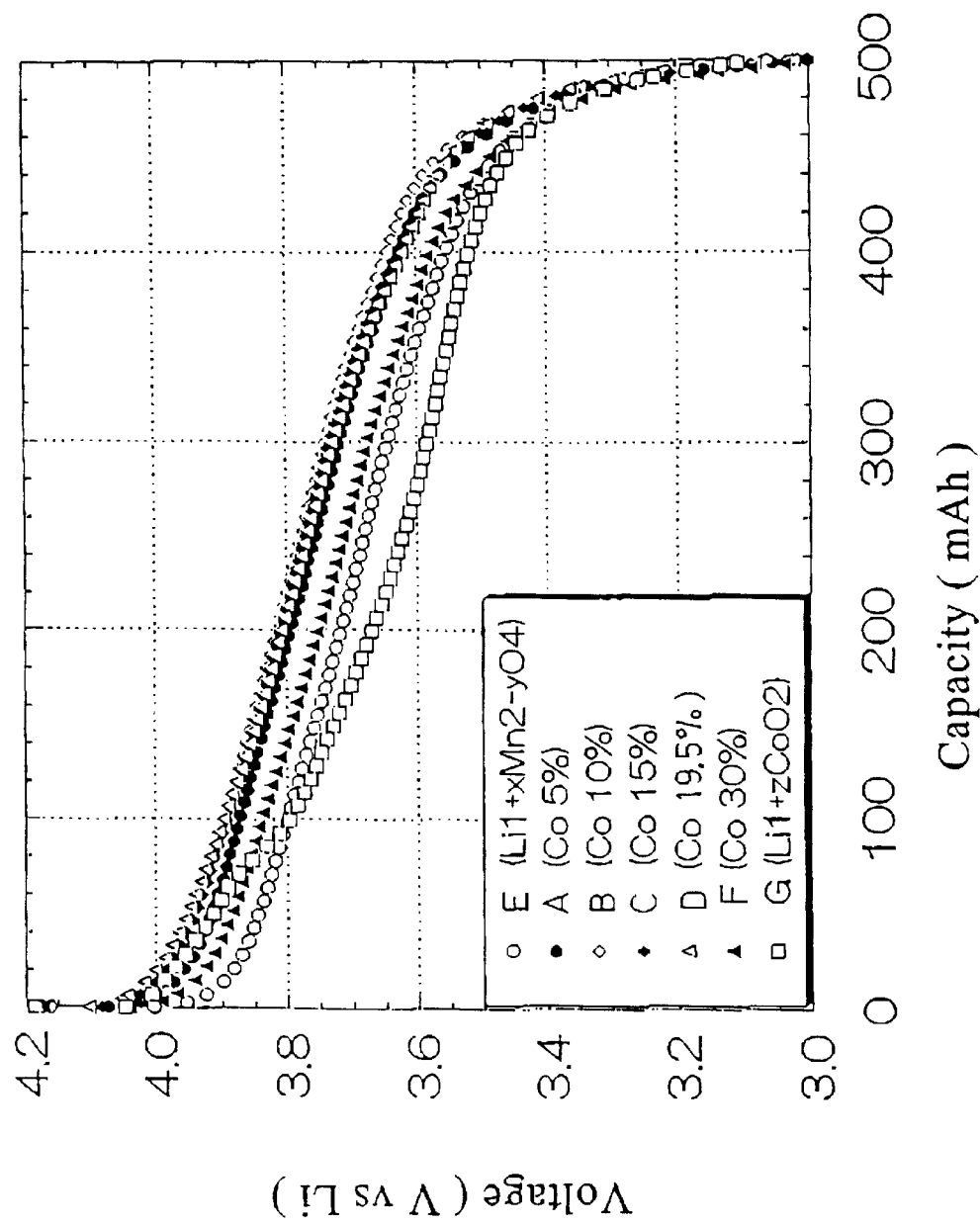
FIG. 3 is a graph showing discharge curves at 500 mA (1C)

In the graph of FIG. 3, the cell A of Example 1 is marked with ●, the cell B of Example 2 is marked with ◇, the cell C of Example 3 is marked with ◆, the cell D of Example 4 is marked with □, the cell E of Comparative example 1 is marked with ○, the cell F of Comparative example 2 is marked with ■ , and the cell G of Comparative example 3 is marked with Δ.

In general, the operative voltage of the positive electrode comprised of lithium cobalt oxide is lower than that of the positive electrode comprised of lithium manganese oxide. Therefore, it has been assumed that the operation voltage is lowered by addition of lithium cobalt oxide to lithium manganese oxide. However, as shown in FIG. 3, the operation voltage of the positive electrode added with lithium cobalt oxide of 20% by weight became higher as in the positive electrodes a), b), c), d) of the cells A, B, C, D respectively marked with the signs ●, ◇, ◆, Δ.

In this case, it is assumed that the result is obtained since the electronic conductivity of lithium cobalt oxide is superior than that of lithium manganese oxide. In the case that lithium cobalt oxide of 20% by weight is added to lithium manganese oxide, the conductivity of lithium cobalt oxide is maintained in a condition where the operation voltage of lithium manganese oxide is being maintained. It is, therefore, assumed that the addition of lithium cobalt oxide to lithium manganese oxide is effective to raise the operation voltage of the respective positive electrodes described above. If the addition amount of lithium cobalt oxide was more that 30% by weight, each operation voltage of the positive electrodes would be influenced by the own property of lithium cobalt oxide and become substantially the same as that of lithium manganese oxide. For this reason, it is desirable that the addition amount of lithium cobalt oxide is determined to be about 20% by weight. In addition, similar results were obtained in a charge-discharge test carried out in a voltage region of 4.3 V to 3.1 V in a three-pole type glass cell.

(5) Overcharge Test

It is assumed that an anti-overcharge characteristic is deteriorated by addition of lithium cobalt oxide to lithium manganese oxide. For this reason, an overcharge test was carried out as described hereinafter. Every three pieces of the experimental cells A–G were overcharged by charging currents of 500 mA (1C) and 1500 mA (3C) to detect abnormality such as operation of a safety valve, leakage of electrolyte, etc. in the cells. The result is shown in the following table 4 in which normality of all the three pieces is marked with ○, abnormality of either one of the three pieces is marked with Δ, and abnormality of all the three pieces is marked with X.

TABLE 4

| Cells | A | B | C | D | E | F | G |
|---|---|---|---|---|---|---|---|
| Overcharge at 1C | ○ | ○ | ○ | ○ | ○ | ○ | ○ |
| Overcharge at 3C | ○ | ○ | ○ | Δ | ○ | X | X |

As is understood from the table 4, any abnormality was not found in the overcharge at 1C. In the overcharge at 3C, however, the addition of lithium cobalt oxide more than 30 wt % caused abnormality in the cells whereas any abnormality was not found in the cells added with lithium cobalt oxide of less than 15 wt %. In the case that the addition amount of lithium cobalt was 19.5 wt %, an occurrence of abnormality was found in some of the experimental cells. It is, therefore, desirable that the addition amount of lithium cobalt oxide is determined less than 20 wt %.

Figure 4:
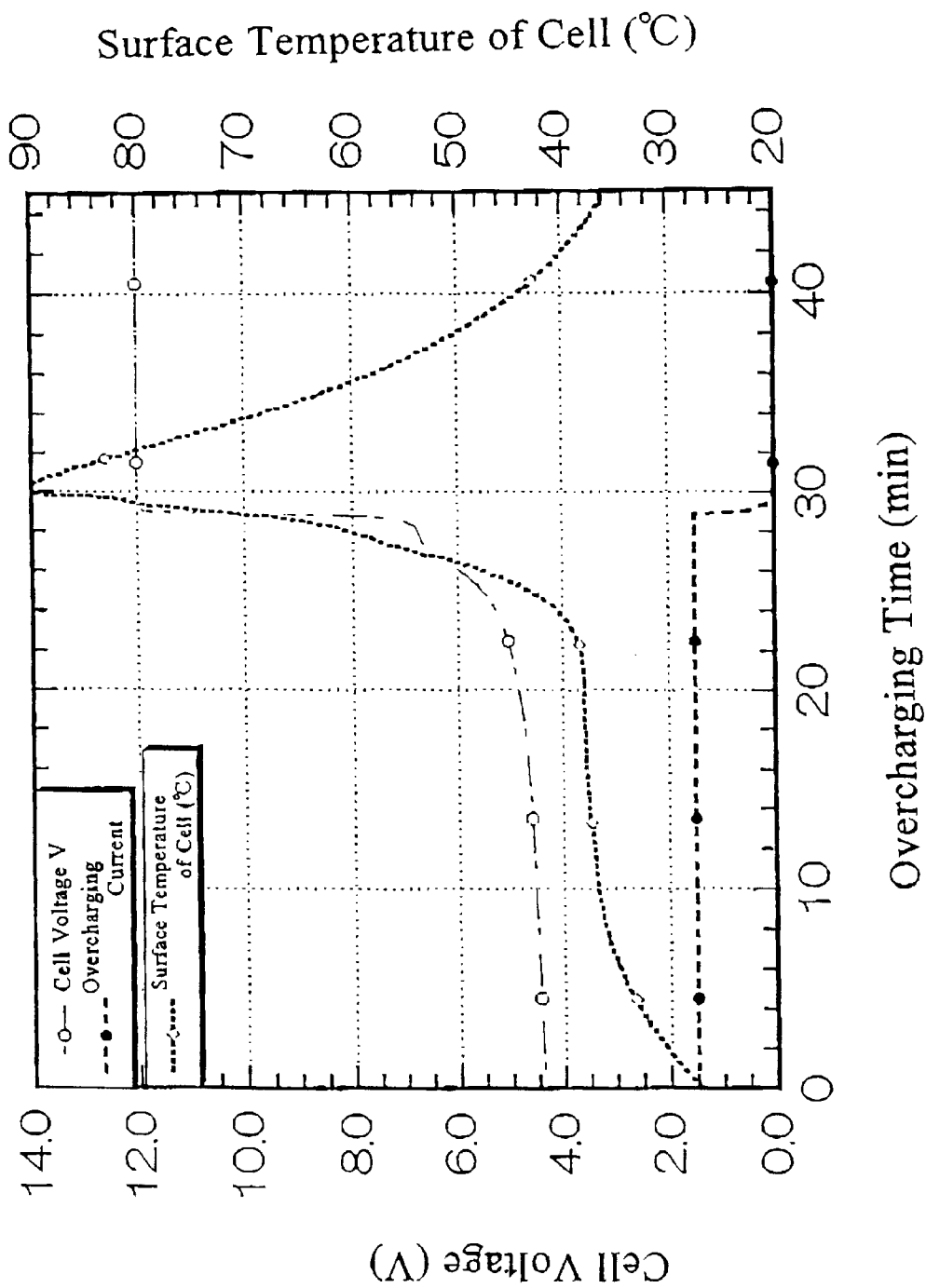
FIG. 4 is a graph showing a cell voltage, an overcharge current and a surface temperature of an experimental cell having a positive electrode added with 15 wt % lithium cobalt oxide measured during overcharge at 3C.
Figure 5:
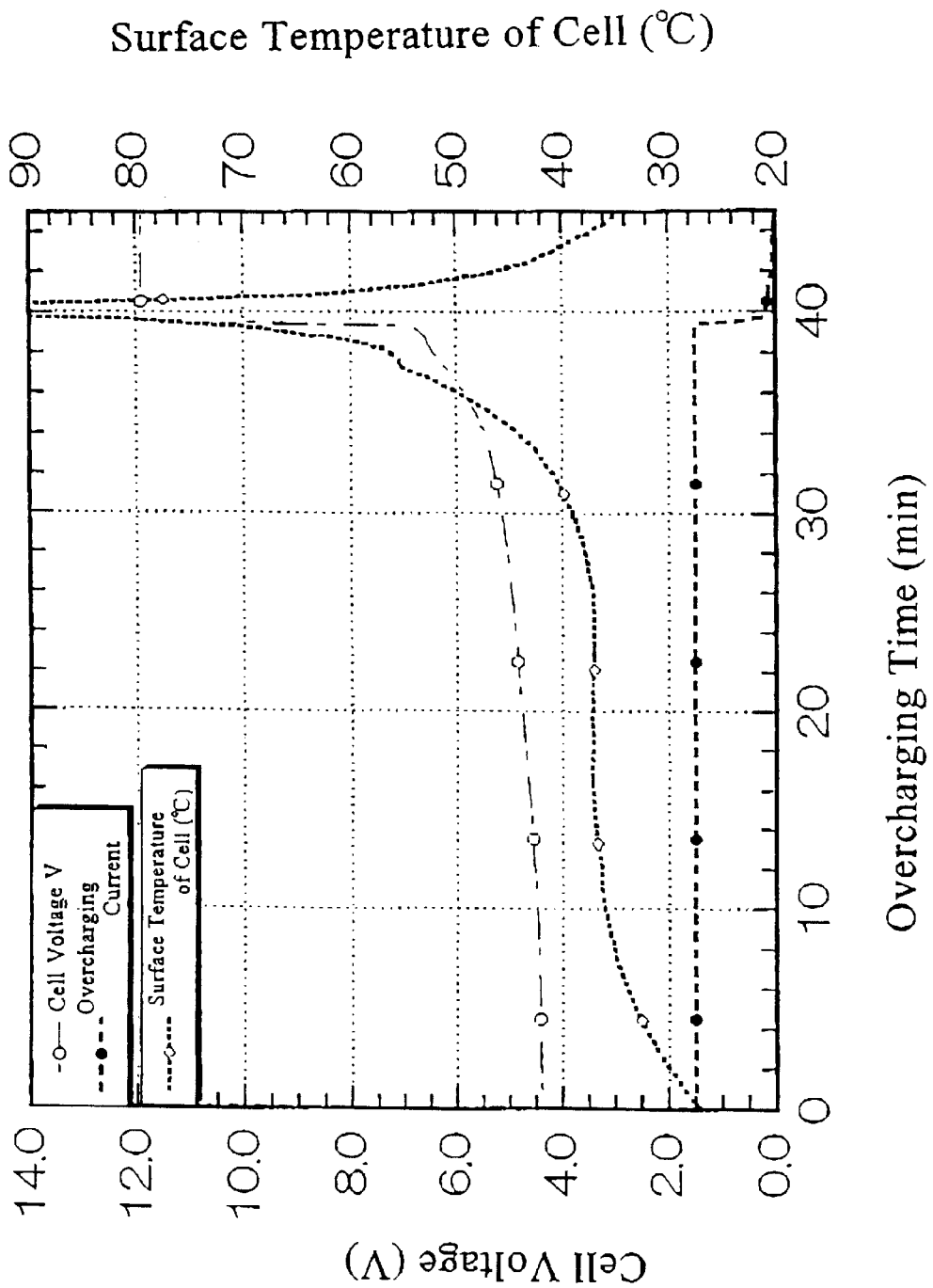
FIG. 5 is a graph showing a cell voltage, an overcharge current and a surface temperature of an experimental cell having a positive electrode added with 20 wt % lithium cobalt oxide measured during overcharge at 3C.

As to the experimental cell C provided with the positive electrode added with lithium cobalt oxide of 15 wt %, the characteristics (the cell voltage, , overcharge current and surface temperature) of the cell was measured during overcharge at 3C. The result is shown in FIG. 4. Similarly, as to the experimental cell D provided with the positive electrode c) added with lithium cobalt oxide of 19.5 wt %, the characteristics of the cell were measured during overcharge at 3C. The result is shown in FIG. 5. The overcharge test at 3C was carried out by using a circuit wherein a charging current is cut off when the cell voltage becomes 12 V.

As shown in FIG. 4, the surface temperature of the cell C was maintained at about 80° C. when the cell voltage increased up to 12 V When the charging current was cut off, the surface temperature of the cell was gradually cooled after raised by remaining heat. As shown in FIG. 5, the surface temperature of the cell D was more than 200° C. when the cell voltage increased up to 12 V In this instance, a safety valve of the cell was operated to radiate the heat from the cell so that the surface temperature of the cell is rapidly lowered. From the above face, it has been found that if the addition amount of lithium cobalt oxide was more than 20 wt %, the cell would overheat when it was overcharged. It is, therefore, desirable that the addition amount of lithium cobalt oxide is determined less than 20 wt %.

5. Investigation of Mixing Method

In a condition where the addition amount of lithium cobalt oxide was determined to be 15 wt %, an appropriate mixing method of lithium manganese oxide and lithium cobalt oxide was investigated to measure the performance of the experimental cells. In such a manner as described above, lithium cobalt oxide of 15 wt % was added to lithium manganese oxide and mixed with an appropriate amount of carbon conductive agent and graphite. The mixture was stirred at high speed under compression, impact and shearing actions to prepare a mixed active material for the positive electrode c).

In addition, a mixture of lithium manganese oxide, lithium cobalt oxide of 15 wt %, and an appropriate amount of carbon conductive agent and graphite was dispersed in a slurry to prepare a mixed active material for a positive electrode h). Furthermore, a mixture of lithium manganate, lithium cobalt oxide of 15 wt % and an appropriate a mount of carbon conductive agent and graphite was mixed under compression and crushing action to prepare a mixed active material for a positive electrode i).

Figure 6:
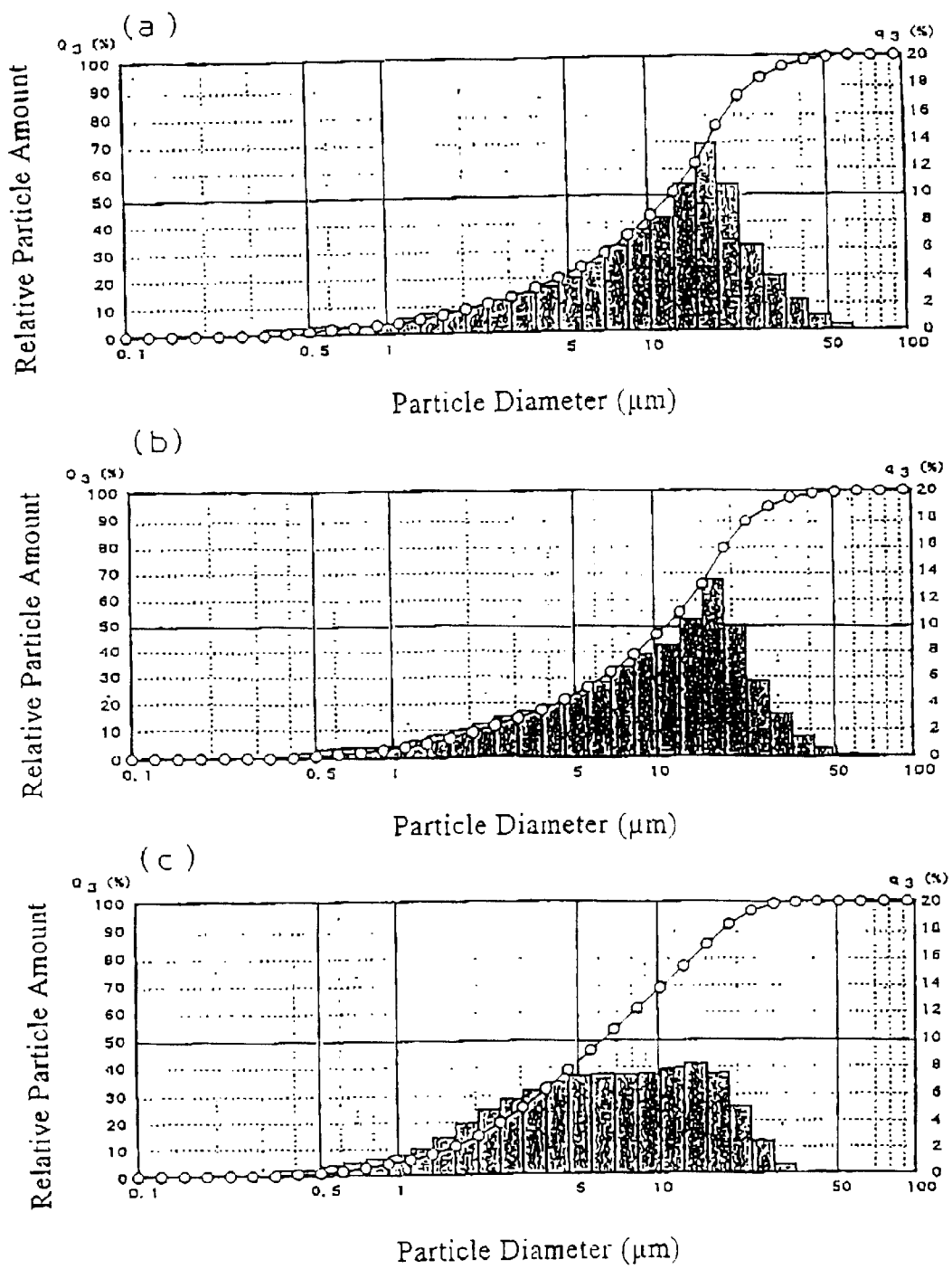
FIG. 6(a) is a graph showing distribution of particles subjected to a high speed stirring process.
FIG. 6(b) is a graph showing distribution of particles subjected to a simple mixing process.
FIG. 6(c) is a graph showing distribution of particles subjected to a crush-miximg process.

In observation of the mixed active materials for the positive electrodes by an electronic microscope, a large amount of particles mixed in contacting directly was found in the mixed active material subjected to the high speed stirring process, while only a small amount of particles mixed in contacting directly was found in the mixed active material subjected to the simple mixing process. The distribution of particles in the mixed active materials for the positive electrodes is shown in FIGS. 6(a), 6(b) and 6(c). The distribution of particles subjected to the high speed stirring process is shown in FIG. 6(a), the distribution of particles subjected to the simple mixing process is shown in FIG. 6(b), and the distribution of particles subjected to the crush-mixing process is shown in FIG. 6(c).

As is understood from FIGS. 6(a), 6(b) and 6(c), a large amount of particles smaller in diameter distributed in the mixed active material subjected to the crush-mixing process since secondary particles caused by sintering in the manufacturing process of lithium manganese oxide were mixed while they are being crushed. On the other hand, the distribution of particles subjected to the high speed stirring process was similar to the distribution of particles subjected to the simple mixing process. This means that the particles subjected to the high speed stirring process are retained in the same shape as that of secondary particles.

Figure 7:
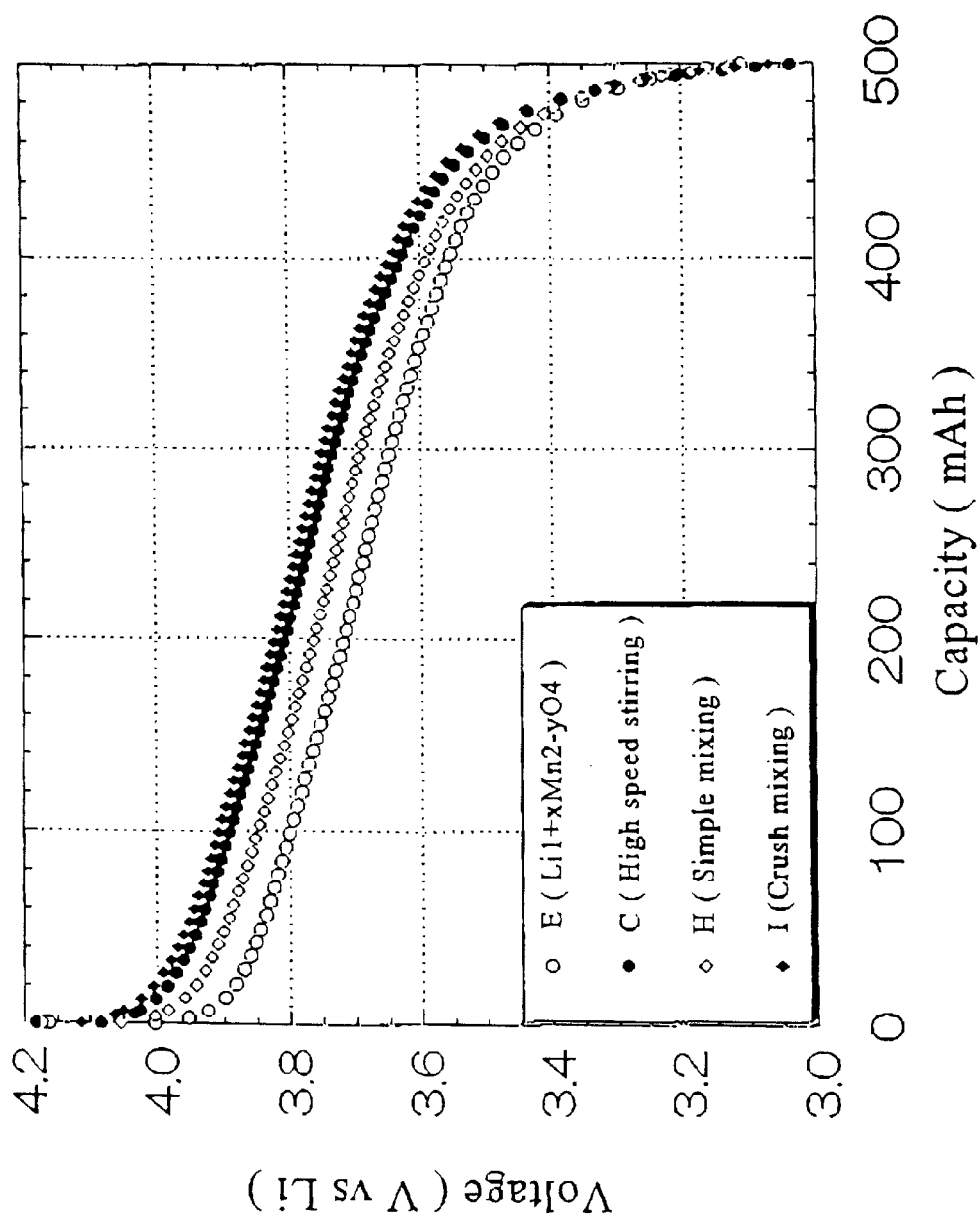
FIG. 7 is a graph showing discharge curves of experimental cells at 500 mA (1C)

The positive electrodes c), h), i ) each were used to manufacture an experimental cell of 500 mAH in nominal capacity. Hereinafter the experimental cells provided with the positive electrodes c), h), i) are referred to cells C, H, I, respectively. In comparison with the experimental cell E with the positive electrode e) of Comparative example I, the experimental cells were charged and discharged in the same manner described above. As a result, discharge curves (500 mA (1C)) were obtained as shown in FIG. 7. As is understood from FIG. 7, an additive effect of lithium cobalt oxide was found in all the experimental cells C, H, I. Provided that, the experimental cells C and I respectively subjected to the high speed mixing process and the crush-mixing process were superior than the experimental cell H subjected to the simple mixing process.

Figure 8:
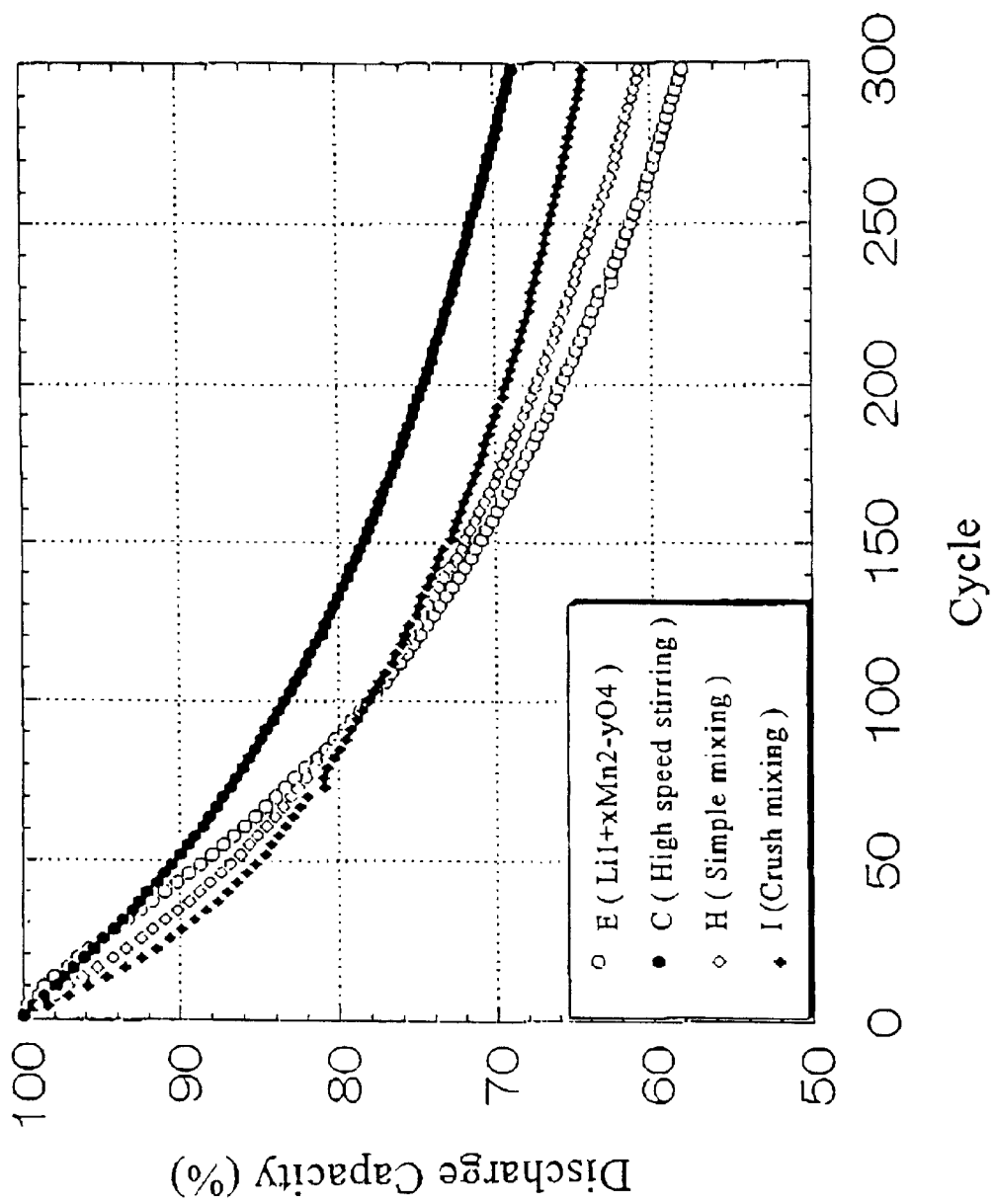
FIG. 8 is a graph showing cycle performance curves of experimental cells at 60° C.

In addition, a high temperature (60° C.) charge-discharge cycle test was carried out for the experimental cells C, H, I, E in the same manner described above. As a result, cycle characteristic curves were obtained as shown in FIG. 8. As is understood from the characteristic curves in FIG. 8, the cell C was superior in its cycle performance than the cell I. In this respect, it is assumed that the cycle performance was deteriorated due to crush of secondary particles in the positive electrode. From the foregoing facts, it is desirable that particles in the positive electrodes are maintained in an integrated condition at a large ratio to enhance the effect caused by addition of lithium cobalt oxide.

6. Addition of Lithium Nickel Oxide

In the manufacturing process of the foregoing positive electrodes, lithium nickel oxide may be added to lithium manganese oxide instead of lithium cobalt oxide as described hereinafter.

Composite powder of 200 g comprised of 85 wt % spinel-type lithium manganese oxide represented by a general formula $Li_{1+X}Mn_{2-Y}O_4$ (provided that X is defined to be $-0.2 \leq X \leq 0.2$ and that Y is defined to be $Y \leq 1.0$) and 15 wt % lithium nickel oxide represented by a general formula $Li_{1+Z}NiO_2$ (provided that Z is defined to be $-0.5 \leq Z \leq 0.5$) was prepared, and an appropriate amount of carbon conductive agent and graphite was added to and mixed with the composite powder. The mixed powder was introduced into a mixing device (For example, a mechano-fusion device (AM-15F) made by Hosokawa Micron Co., Ltd.)

The mixing device was operated at a rotation speed of 1500 rpm for ten minutes to mix the composite powder under compression, impact and shearing actions to prepare a mixed active material for a positive electrode. In such an instance, lithium nickel oxide was brought into electric contact with lithium manganese oxide. Subsequently, an amount of fluorocarbon resin binder was mixed with the mixed active material at a predetermined ratio to produce a mixed agent for the positive electrode. Thus, the mixed agent was coated on opposite surfaces of a positive electrode collector after dried to produce a positive electrode j) of predetermined thickness.

Figure 9:
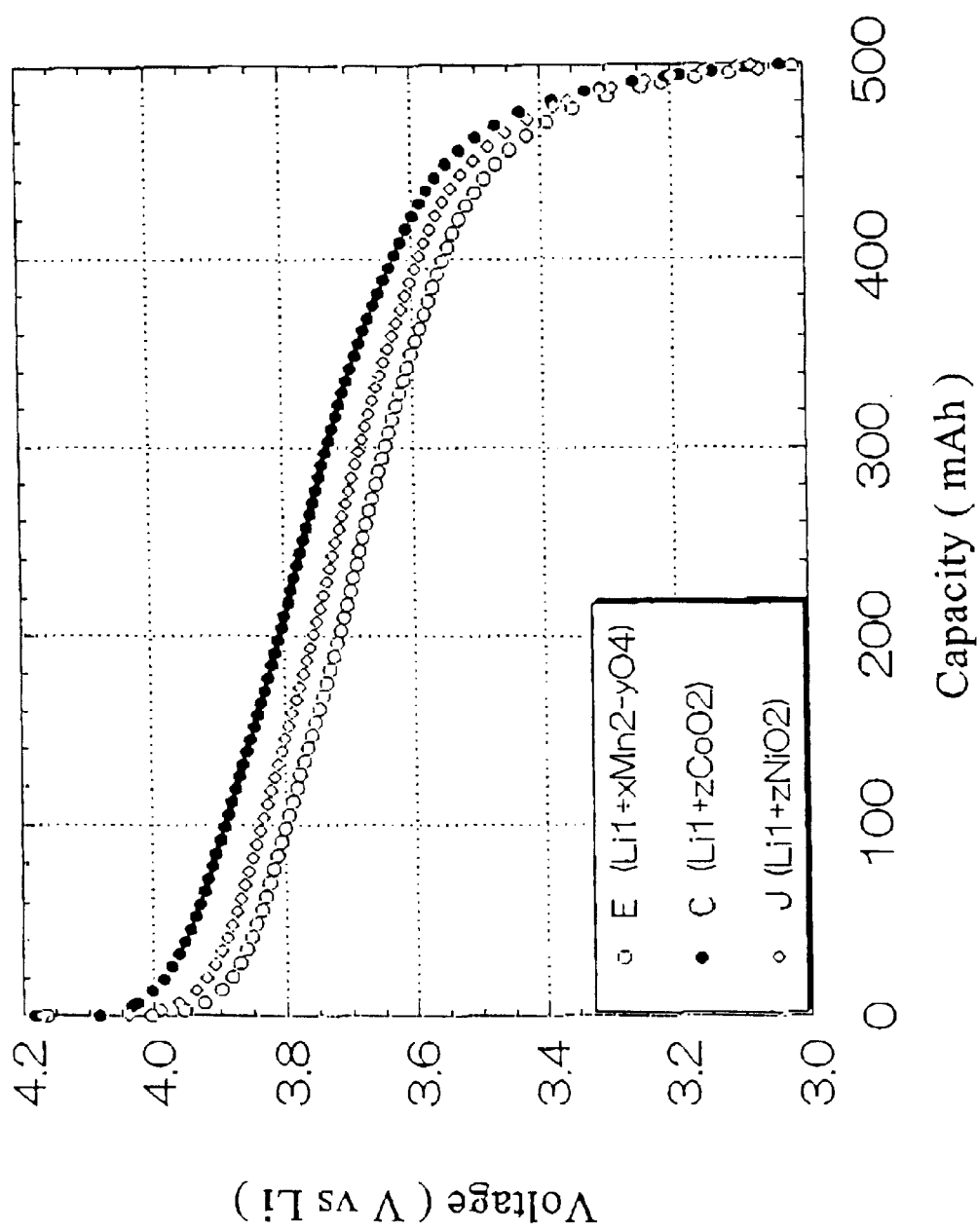
FIG. 9 is a graph showing charge-discharge curves of experimental cells at 500 mA (1C)

The positive electrode j) was used to manufacture an experimental cell J of 500 mAH in nominal capacity in the same manner described above. In comparison with the experimental cells C and E, the experimental cell J was charged and discharged at 500 mA (1C) in the same manner described above. As a result, charge-discharge curves were obtained as shown in FIG. 9. As is understood from the charge-discharge curves in FIG. 9, the discharge performance of the cell J was enhanced even if lithium nickel oxide is used instead of lithium cobalt in the manufacturing process of the positive electrode.

In addition, the experimental cells J, E, C were charged in the same manner described above until the cell voltage becomes 4.2 V After charged at the constant voltage of 4.2 V, the cells were stored at a high temperature (60° C.) for twenty days. A result of the high temperature storage test is shown in the following table 5.

TABLE 5

| Cell | Voltage drop (V) | Generation amount of gas (ml) | Retention rate of capacity | Recovery rate of capacity |
|---|---|---|---|---|
| J | 0.16 | 3.1 | 59 | 76 |
| E | 0.17 | 6.2 | 56 | 72 |
| C | 0.15 | 2.7 | 61 | 78 |

The experimental cells J, E, C were discharged until the cell voltage becomes 3.0 V Thereafter, the cells were stored at 60° C. for twenty days. A result of the high temperature storage test is shown in the following table 6.

TABLE 6

| Cell | Voltage drop (V) | Generation amount of gas (ml) |
|---|---|---|
| J | 1.21 | 3.1 |
| E | 3.44 | 8.9 |
| C | 0.63 | 2.4 |

As is understood from the tables 5 and 6, it has been found that the discharge performance of the cells is enhanced even if lithium nickel oxide is substituted for lithium cobalt oxide in the manufacturing process of the positive electrode for the experimental cell J.

7. Investigation of Atomic Ratio

Although in the foregoing experiments, the atomic ratio of lithium and manganese (Li/Mn) in the spinel-type lithium manganese oxide was defined to be 0.601, the atomic ratio should be defined taking into account the energy density of lithium manganese oxide and the cycle performance at 60° C. The retention rate of capacity of lithium manganese oxide in 300 cycle at 60° C. were measured in relation to the atomic ratio of lithium and manganese (Li/Mn) as shown in FIG. 10, and a capacity of an active material for a positive electrode per unit active material (a specific capacity of an active material for a positive electrode) was measured in relation to the atomic ratio of lithium and manganese as shown in FIG. 11.

Figure 10:
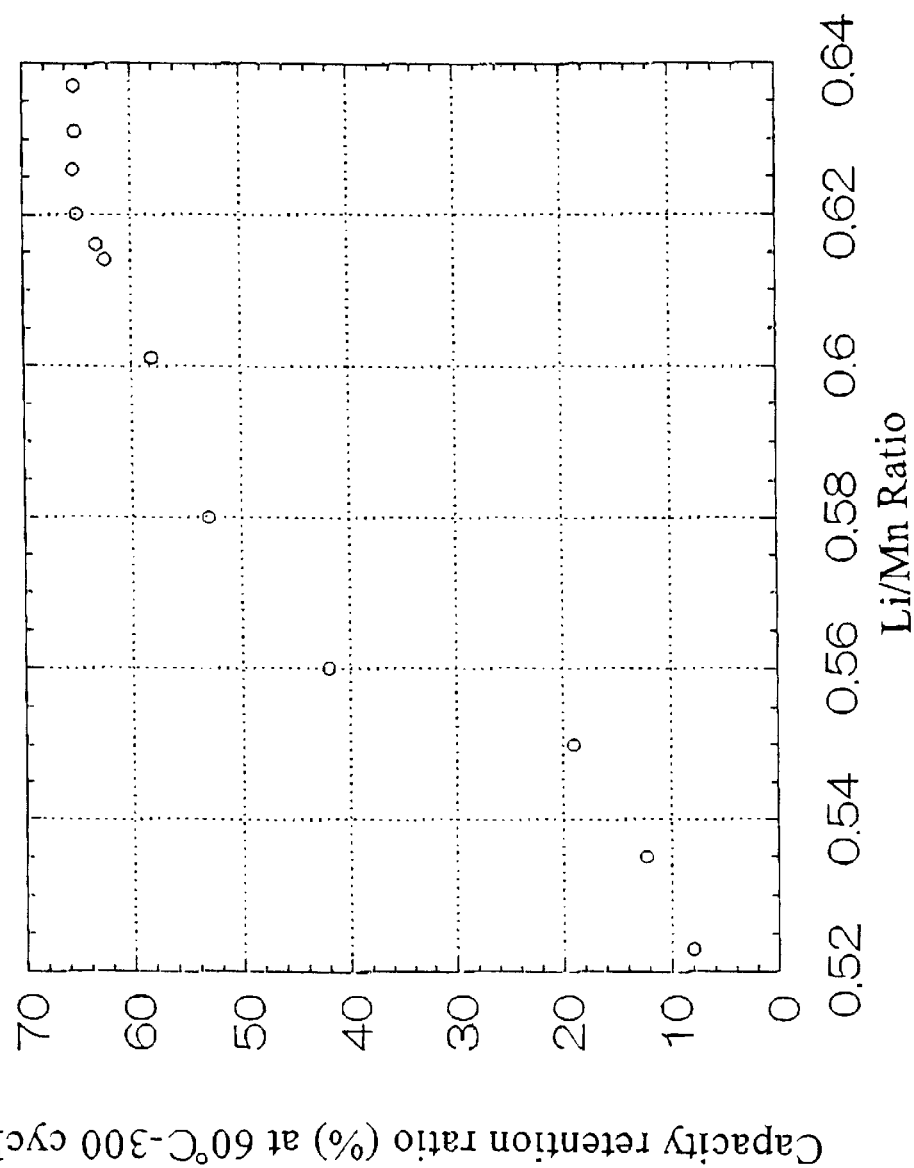
FIG. 10 is a graph showing a retention rate of capacity of lithium manganese oxide in relation to an atomic ratio of lithium and manganese (Li/Mn)
Figure 11:
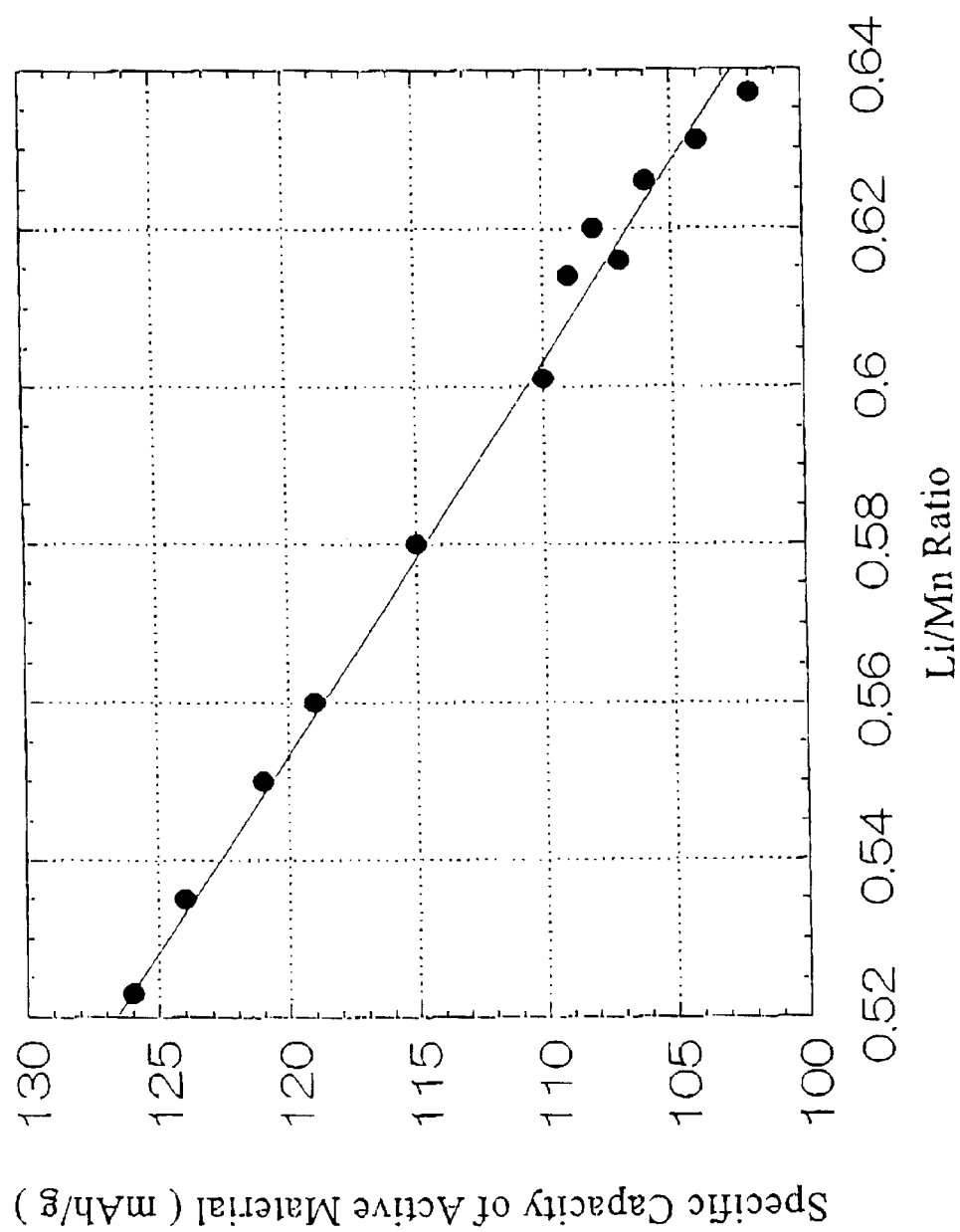
FIG. 11 is a graph showing each specific capacity of active materials for positive electrodes in relation to an atomic ratio of lithium and manganese (Li/Mn).

As is understood from FIG. 10, if the atomic ratio (Li/Mn) is more than 0.56, the retention rate of capacity in 300 cycle at 60° C. is increased in accordance with an increase of the atomic ratio. However, even if the atomic ratio is increases more than 0.62, the retention rate of capacity does not increase. From FIG. 11, it has been found that the specific capacity of the active material is decreased in accordance with an increase of the atomic ratio. It is, therefore, desirable that for enhancement of the retention rate of capacity, the atomic ratio of lithium and manganese (Li/Mn) is defined to be $0.56 \leq Li/Mn \leq 0.62$.

In the case that a portion of the spinel-type lithium manganese oxide is substituted for a different kind of metal (for example, Mg, Al, Ca, V, Ti, Cr. Fe, Co, Ni, Cu, Zn, Sr, Zr, Nb, Mo, Sn, etc), it is desirable that an atomic ratio of lithium to the sum of manganese and different metal (Metal) is defined to be $0.56 \leq Li/(Mn+Metal) \leq 0.62$.

8. Manufacture of Solid Polymer Electrolytic Cell

Although in the foregoing experiments, the present invention was adapted to manufacture of lithium-ion cells, the present invention can be adapted to manufacture of solid polymer electrolytic cells. As the solid polymer electrolyte is relatively higher in vicosity, problems in impregnation of the electrolyte will occur in use of only lithium manganese oxide. In this respect, the present invention is useful to make the positive electrode of the polymer electrolytic cell as thinner as possible.

In application of the present invention, it is preferable that polymer selected from the group consisting of solid polymer of polycarbonate, solid polymer of polyacrylonitrile, copolymer or bridged polymer comprised of more than two kinds of the solid polymers and fluorine solid polymer such as polyvinylidene difluoride (PVDF) mixed with lithium salt and electrolyte and formed in gel to prepare a solid polymer electrolyte.

For example, a solid polymer electrolytic cell according to the present invention was manufactured as described hereinafter. A porous polyethylene substrate was disposed between positive and negative electrodes and contained in a cell casing. On the other hand, a mixed solvent of polyethylene grycol (1000 in molecular weight) and ethylene carbonate or diethyl carbonate was prepared, and solution of 1 mol/1 lithium hexafluorophosphate ($LiPF_6$) was mixed with the mixed solvent at a volume ratio of 1:10. After added with t-hexyl peroxypivalate of 5000 ppm, 3 ml of the mixed solution was filled in the cell casing and heated at 60 ?C for three hours to produce a solid polymer electrolytic cell. In this case, the positive electrode c) of Example 3 was used to manufacture the solid polymer electrolytic cell as a sample cell K, and the positive electrode e) of Comparative Example 1 was used to manufacture the solid polymer electrolytic cell as a sample cell L.

The sample cells K and L were charged in the same manner described above until the cell voltage becomes 4.2 V Thereafter, the cells K and L were stored at 60 ?C for twenty days to measure the cell voltage and a generation amount of gaseous products and to calculate a retention rate of capacity and a recovery rate of capacity as shown in the following table 7.

TABLE 7

| Cell | Voltage drop (V) | Generation amount (ml) | Retention rate of capacity | Recovery rate of capacity |
| --- | --- | --- | --- | --- |
| K | 0.13 | 1.6 | 63 | 79 |
| L | 0.15 | 4.8 | 59 | 73 |

The sample cells K and L were discharged in the same manner described above until the cell voltage becomes 3.0 V and stored at 60 ?C for twenty days to measure the cell voltage and a generation amount of gaseous products as shown in the following table 8.

TABLE 8

| Cell | Voltage drop (V) | Generation amount of gas (ml) |
| --- | --- | --- |
| K | 0.53 | 1.7 |
| L | 3.22 | 5.3 |

As is understood from the tables 7 and 8, it has been found that an additive effect of lithium cobalt oxide appears in the solid polymer electrolytic cells as in the lithium-on cells.

From the above detail description, it will be understood that in the non-aqueous electrolyte cells according to the present invention, self-discharge of lithium manganese oxide used as a main active material is restrained by addition of an appropriate amount of lithium cobalt oxide or lithium nickel oxide to enhance high temperature storage performance of the cell.

What is claimed is:

1. A positive electrode for a non-aqueous electrolyte cell containing lithium manganese oxide as a main active material, wherein:

the positive electrode comprises a mixture of (a) lithium manganese oxide and (b1) lithium cobalt oxide or (b2) lithium nickel oxide, the lithium manganese oxide being represented by formula $Li_{1+x}Mn_{2-y}O_4$, where the atomic ratio of lithium and manganese is $0.56 \leq Li/Mn \leq 0.62$, $Li/Mn=(1+X)/(2-Y)$, X being $-0.2 \leq X \leq 0.2$, and Y being $Y \leq 1.0$, and the lithium cobalt oxide being represented by the formula (a) $Li_{1+z}CoO_2$, where Z is $-0.5 \leq Z \leq 0.5$ or the lithium nickel oxide being represented by the formula $Li_{1+z}NiO_2$ where Z is $-0.5 \leq Z \leq 0.5$, wherein the weight of the lithium manganese oxide is A and the weight of the lithium cobalt oxide or the lithium nickel oxide is B, the amount of the lithium cobalt oxide or lithium nickel oxide then being $0.05 \leq B/(A+B) < 0.2$ wherein a portion of (a) the lithium manganese oxide and (b1) the lithium cobalt oxide or (b2) lithium nickel oxide is substituted for a metal selected from the group consisting of magnesium, aluminum, calcium, vanadium, titanium, chromium, iron, cobalt, nickel, copper, zinc, strontium, zirconium, molybdenum and tin.

2. A positive electrode for a non-aqueous electrolyte cell as in claim 1 wherein an atomic ratio "C," defined as a ratio of lithium to a sum of manganese and said substituted metal, is $0.56 \leq C \leq 0.62$.

3. A manufacturing method for a positive electrode for a non-aqueous electrolyte cell containing lithium manganese oxide as a main active material, said method comprising:

preparing powder of (a) lithium manganese oxide represented by the formula $Li_{1+x}Mn_{2-y}O_4$ where the atomic ratio of lithium and manganese is $0.56 \leq Li/Mn \leq 0.62$, $Li/Mn=(1+X)/(2-Y)$, X is $-0.2 \leq X \leq 0.2$, and Y is $Y \leq 1.0$ preparing powder of (b1) lithium cobalt oxide represented by the formula $Li_{1+z}CoO_2$ where Z is $-0.5 \leq Z \leq 0.5$ or (b2) lithium nickel oxide represented by the formula $Li_{1+z}NiO_2$ where Z is $-0.5 \leq Z \leq 0.5$, and mixing the powder of (a) lithium manganese oxide with the powder of (b1) the lithium cobalt oxide or (b2) lithium nickel oxide under compression, impact and shearing actions, wherein a portion of the lithium manganese oxide and the lithium cobalt oxide or lithium nickel oxide is substituted for a metal selected from the group consisting of magnesium, aluminum, calcium, vanadium, titanium, chromium, iron, cobalt, nickel, copper, zinc, strontium, zirconium, molybdenum and tin.

4. The manufacturing method for a positive electrode as in claim 3 wherein the powder of (a) the lithium manganese oxide and the powder of (b1) lithium cobalt oxide or (b2) lithium nickel oxide are crushed and mixed with each other.

5. The manufacturing method for a positive electrode as in claim 3 wherein an atomic ratio "C," defined as a ratio of lithium to a sum of manganese and said substituted metal, is $0.56 \leq C \leq 0.62$.

6. A non-aqueous electrolyte cell having:

a negative electrode capable of intercalating and deintercalating a lithium-ion, a positive electrode containing lithium manganese oxide as a main active material and an amount of non-aqueous electrolyte, wherein the positive electrode comprises a mixture of lithium manganese oxide and lithium cobalt oxide or lithium nickel oxide the lithium manganese oxide is represented by the formula $Li_{1+X}Mn_{2-Y}O_4$, where the atomic ratio of lithium and manganese is $0.56 \leq Li/Mn \leq 0.62$, $Li/Mn=(1+X)/(2-Y)$, X is $0.2 \leq X \leq 0.2$, and Y is $Y \leq 1.0$ and the lithium cobalt oxide is represented by the formula $Li_{1+Z}CoO_2$ where Z is $-0.5 \leq Z \leq 0.5$ or the lithium nickel oxide is represented by the formula $Li_{1+Z}NiO_2$ where Z is $-0.5 \leq Z \leq 0.5$, and where the weight of the lithium manganese oxide is A and the weight of the lithium cobalt oxide or lithium nickel oxide is B, the amount of lithium cobalt oxide or lithium nickel oxide is $0.5 \leq B/(A+B) < 0.2$, wherein a portion of the lithium manganese oxide and the lithium cobalt oxide or lithium nickel oxide is substituted for a mental selected from the group consisting of magnesium, aluminum, calcium, vanadium, titanium, chromium, iron, cobalt, nickel, copper, zinc, strontium, zirconium, molybdenum and tin.

7. A non-aqueous electrolyte cell as in claim 6 wherein:

an atomic ratio "C", defined as a ratio of lithium to a sum of manganese and said substituted metal, being $0.56 \leq C \leq 0.62$.

8. A non-aqueous electrolyte cell as in claim 6 wherein the non-aqueous electrolyte is selected from either an organic electrolyte solution or a solid polymer electrolyte.

9. A non-aqueous electrolyte cell as in claim 8 wherein the solid polymer electrolyte is in the form of a mixed gel of lithium salt, electrolyte, and polymer selected from the group consisting of a solid polymer of polycarbonate, a solid polymer of polyacrylonitrile, a copolymer or bridged polymer comprised of two kinds of the solid polymers and a fluorine solid polymer.

10. A manufacturing method for a non-aqueous electrolyte cell having a negative electrode capable of intercalating and deintercalating a lithium-ion, a positive electrode containing lithium manganese oxide as a main active material and an amount of non-aqueous electrolyte, said method comprising:

preparing powder of (a) lithium manganese oxide represented by the formula $Li_{1+X}Mn_{2-Y}O_4$, where the atomic ratio of lithium and manganese is $0.56 \leq Li/Mn \leq 0.62$, $Li/Mn=(1+X)/(2-Y)$, is $-0.2 \leq X \leq 0.2$, and Y is $Y \leq 1.0$ preparing powder of (b1) lithium cobalt oxide represented by the formula $Li_{1+Z}CoO_2$ where Z is $-0.5 \leq Z \leq 0.5$ or (b2) lithium nickel oxide represented by the formula $Li_{1+Z}NiO_2$ where Z is $-0.5 \leq Z \leq 0.5$, and mixing the powder of (a) lithium manganese oxide with the powder of (b1) lithium cobalt oxide (b2) lithium nickel oxide under compression, impact and shearing actions, wherein a portion of the lithium manganese oxide and the lithium cobalt oxide or lithium nickel oxide is substituted for a metal selected from the group consisting of magnesium, aluminum, calcium, vanadium, titanium, chromium, iron, cobalt, nickel, copper, zinc, strontium, zirconium, molybdenum and tin.

11. The manufacturing method for a non-aqueous electrolyte cell as in claim 10 wherein the powders of lithium manganese oxide and lithium cobalt oxide or lithium nickel oxide are crushed and mixed with each other.

12. The manufacturing method for a non-aqueous electrolyte cell as in claim 10 wherein an atomic ratio "C," defined as a ratio of lithium to a sum of manganese and said substituted metal, is $0.56 \leq C \leq 0.62$.

13. The manufacturing method for a non-aqueous electrolyte cell as in claim 10 wherein the non-aqueous electrolyte is selected from either an organic electrolyte solution or a solid polymer electrolyte.

14. The manufacturing method for a non-aqueous electrolyte cell as in claim 13 wherein the solid polymer electrolyte is in the form of a mixed gel of lithium salt, electrolyte, and polymer selected from the group consisting of a solid polymer of polycarbonate, a solid polymer of polyacrylonitrile, a copolymer or bridged polymer comprised of two kinds of the solid polymers and fluorine solid polymer.

* * * * *